US012750673B2

(12) United States Patent
Neidlinger et al.

(10) Patent No.: US 12,750,673 B2
(45) Date of Patent: Sep. 29, 2026

(54) AUTHENTICATION HARDENING WITH PROOF OF PROXIMITY OVER LOCAL CONNECTION

(71) Applicant: Cisco Technology, Inc., San Jose, CA (US)

(72) Inventors: Jordan Neidlinger, Saline, MI (US); Benjamin Warren Freiband, Ann Arbor, MI (US); Kyle Mills, Ann Arbor, MI (US); Joshua King, Ann Arbor, MI (US); Marshall Anderson, Chicago, IL (US); Aparna Ashok, Duvall, WA (US); Brendan Lau, Ypsilanti, MI (US); Gursirat Singh, Mississauga (CA); Dylan Miles Kite, Ann Arbor, MI (US); Robert Small, Ann Arbor, MI (US); Shayne Miel, Durham, NC (US); Richard Harang, Alexandria, VA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 18/349,681

(22) Filed: Jul. 10, 2023

(65) Prior Publication Data

US 2024/0196220 A1 Jun. 13, 2024

Related U.S. Application Data

(63) Continuation-in-part of application No. 18/063,151, filed on Dec. 8, 2022.

(51) Int. Cl.
*H04W 12/50* (2021.01)
*H04W 12/03* (2021.01)
(Continued)

(52) U.S. Cl.
CPC ........... *H04W 12/50* (2021.01); *H04W 12/03* (2021.01); *H04W 12/069* (2021.01); *H04W 12/63* (2021.01)

(58) Field of Classification Search
CPC ... H04W 12/03; H04W 12/50; H04W 12/069; H04W 12/63
See application file for complete search history.

(56) References Cited

U.S. PATENT DOCUMENTS

| | | | |
|---|---|---|---|
| 9,614,828 | B1 | 4/2017 | Golwalkar et al. |
| 10,701,067 | B1 | 6/2020 | Ziraknejad et al. |

(Continued)

FOREIGN PATENT DOCUMENTS

| | | | |
|---|---|---|---|
| EP | 3335142 | B1 | 8/2022 |

OTHER PUBLICATIONS

"Bluetooth Low Energy", Wikipeida, Apr. 30, 2022, pp. 1-15.

(Continued)

*Primary Examiner* — Nicholas P Celani
(74) *Attorney, Agent, or Firm* — Polsinelli P.C.

(57) ABSTRACT

A device may receive, from a computing device, a request for a two-factor authentication of a user. A device may transmit, from a server to the computing device and based on the request, multi-factor authentication data to the computing device. A device may establish a short-distance wireless communication link between the computing device and a registered mobile device. A device may transmit, from the computing device and via the short-distance wireless communication link, encrypted data which is encrypted based on the multi-factor authentication data, to the registered mobile device. A device may receive, at the server and from the registered mobile device, a confirmation that corrected data was decrypted from the encrypted data. A device may (Continued)

provide, based on the confirmation, the user with access to a service via the computing device.

17 Claims, 6 Drawing Sheets

(51) Int. Cl.
*H04W 12/069* (2021.01)
*H04W 12/63* (2021.01)

(56) References Cited

U.S. PATENT DOCUMENTS

| | | | | |
|---|---|---|---|---|
| 2011/0050947 | A1 | 3/2011 | Marman et al. | |
| 2011/0154460 | A1 | 6/2011 | Khare et al. | |
| 2012/0263346 | A1 | 10/2012 | Datta et al. | |
| 2013/0174252 | A1 | 7/2013 | Weber et al. | |
| 2013/0262858 | A1 | 10/2013 | Neuman et al. | |
| 2014/0149746 | A1 | 5/2014 | Yau | |
| 2014/0189841 | A1 | 7/2014 | Metke et al. | |
| 2015/0154457 | A1 | 6/2015 | Datta et al. | |
| 2015/0281227 | A1 | 10/2015 | Ivey et al. | |
| 2016/0142443 | A1* | 5/2016 | Ting | H04L 63/20 726/1 |
| 2016/0286393 | A1 | 9/2016 | Rasheed et al. | |
| 2016/0308859 | A1 | 10/2016 | Barry et al. | |
| 2017/0208055 | A1* | 7/2017 | Golwalkar | H04L 63/205 |
| 2018/0097806 | A1 | 4/2018 | Blinn | |
| 2018/0232889 | A1 | 8/2018 | Storer et al. | |
| 2019/0036940 | A1 | 1/2019 | Balakrishnan et al. | |
| 2019/0197697 | A1 | 6/2019 | Sripada | |
| 2019/0208421 | A1 | 7/2019 | Ziraknejad et al. | |
| 2019/0238532 | A1 | 8/2019 | Alexander et al. | |
| 2020/0103513 | A1 | 4/2020 | Knaappila | |
| 2020/0213298 | A1 | 7/2020 | Ericson | |
| 2020/0380266 | A1 | 12/2020 | Nadathur et al. | |
| 2022/0109674 | A1* | 4/2022 | Avetisov | H04L 63/0884 |

OTHER PUBLICATIONS

International Search Report and Written Opinion for International Application No. PCT/US2024/036785, mailed Oct. 10, 2024, 12 Pages.

* cited by examiner

AUTHENTICATION HARDENING WITH PROOF OF PROXIMITY OVER LOCAL CONNECTION

PRIORITY CLAIM

The present application is a continuation-in-part patent application claiming priority to application Ser. No. 18/063,151, filed Dec. 8, 2022, the contents of which are incorporated herein by reference.

FIELD OF THE INVENTION

The present disclosure relates to multi-factor authentication and more specifically to a novel approach to determining a proximity of two devices within a certain threshold range as part of a multi-factor authentication process in which the code verification occurs automatically without the user typing in any code.

BACKGROUND

Authentication into an account or service often involves two-factor authentication. This serves the purposes of increasing security and preventing unwanted parties from accessing accounts/services upon only compromising a person's password. One common form of two-factor authentication relates to the use of mobile push notifications. In this case, when a user seeks to login to access a service, a mobile push notification can be provided in which a mobile phone (with a phone number in the user profile) receives a push notification of an access code. The user receives the access code and enters the code into an input field on their computer.

Two-factor authentication relies on two "factors" in the authentication process. For example, the approach relates to something you know (a password) and something you have (a mobile device). In some cases, the "thing you have" may be a mobile phone application previously registered with a service, such that it can receive push notifications in order to authenticate. However, push notifications alone have the potential vulnerability of being phished. A malicious actor may compromise somebody's first factor (their password), trigger sending a push notification to the mobile device, and then use social engineering to convince the person to press an "Approve" button. The bad actor may provide a different instruction to the user as part of the "authentication" process which enables the bad actor to gain access to the user's account or the service. Alternatively, a malicious actor may compromise somebody's password and then attempt to sign in at the beginning of the work day, when someone habitually approves all authentication pushes.

Some two-factor authentication systems additionally make use of "code matching" in order to add an additional layer of security, and increase the barrier for phishing. This is a somewhat more recent development when associated also with a push notification. In order for a user to authenticate, they must enter on their phone a code that is displayed on the screen where they're attempting to log in. In this way, phishing requires more effort than just tricking someone into pressing "approve". In order for the malicious actor to gain access to someone's account, they must communicate that code to the victim so that they can enter it on their phone. This increases the effort and complexity required for a push to be phished, but does not eliminate the possibility of doing so. If a malicious actor impersonates a company support engineer and asks the victim to enter the verification code when they get a push, the victim may be convinced to do so.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
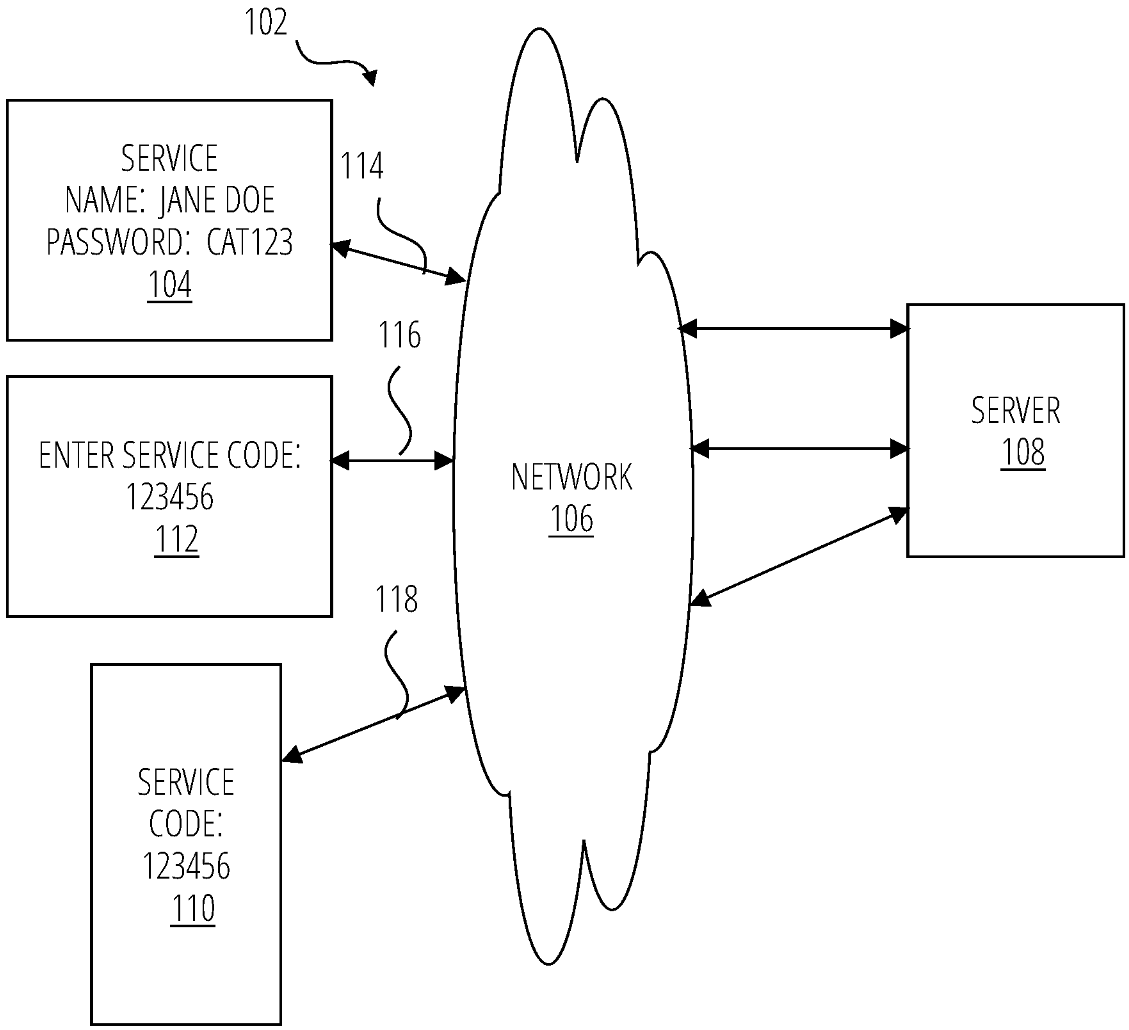
FIG. 1 (PRIOR ART)
FIG. 1 illustrates a prior art approach to two-factor authentication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for providing novel approaches to multi-factor authentication.

In order to address the issues raised above, the present disclosure increases the security hardening of two-factor authentication via mobile push notifications. The approach disclosed herein mitigates the risks of phishing. It can be difficult to guarantee that the person attempting to log into an account is the same person approving the authentication via a second factor.

The current state of the art discussed above involves either interacting with a push notification alone, or relate to using number matching codes for push-based two-factor authentication. This disclosure addresses the phishing risk in the current state of the art by using local wireless communication between two devices to securely transmit the number matching code (or another piece of information serving the same purpose).

In addition, the currents state of the art involves entering a number matching code manually. This disclosure eliminates the need to manually enter that number matching code while still preserving all of the security properties of the manual code entry method. This also eliminates the user hassle from time spent entering a code, as well as the potential for user-error in entering the wrong code. The new system can use Bluetooth (or some other local wireless connection) to transmit the code and it would only be automatically transferred based on proximity. This approach hardens the security against those who are attempting to phish someone remotely. By eliminating the need to manually enter a number matching code, the approach gains the ability to add more entropy to the exchange. For example, number matching codes are generally 4-8 digits because they need to be entered by hand. With this disclosure, there is no reason the security code could not be increased to any larger number of digits and/or alphanumeric codes. In the disclosed approach, the code is verified automatically with no need to type in any code. This makes the code more secure and complex.

In some aspects, the techniques described herein relate to a method of authenticating a user, the method including: receiving, from a computing device, a request for a two-factor authentication of a user; transmitting, from a server to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, at the server and from the registered mobile device, a confirmation that corrected data was decrypted from the encrypted data; and providing, based on the confirmation, the user with access to a service via the computing device.

In some aspects, the techniques described herein relate to a system for authenticating a user, the system including: at least one processor; and a computer-readable storage device storing instructions which, when executed by the at least one processor, cause the at least one processor to perform operations including: receiving, from a computing device, a request for a two-factor authentication of a user; transmitting, to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, from the registered mobile device, a confirmation that corrected data was decrypted from the encrypted data; and providing, based on the confirmation, the user with access to a service via the computing device.

In some aspects, the techniques described herein relate to a computer-readable storage device storing instructions which, when executed by at least one processor, cause the at least one processor to perform operations including: receiving a request for a two-factor authentication of a user; transmitting, from a server to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, at the server and from the registered mobile device, a confirmation that corrected data was decrypted from the encrypted data; and providing, based on the confirmation, the user with access to a service via the computing device.

In some aspects, the techniques described herein relate to a method including: transmitting multi-factor authentication data to a computing device; transmitting a private key to an authentication device; generating, on the computing device, encrypted data based on the multi-factor authentication data; transmitting the encrypted data to the authentication device via a short-distance communication protocol; confirming proximity between the computing device and the authentication device by decrypting the encrypted data via the private key; and enabling a user access to a service on the computing device based on the confirming of the proximity between the computing device and the authentication device.

In some aspects, the techniques described herein relate to a system for authenticating a user, the system including: at least one processor; and a computer-readable storage device storing instructions which, when executed by the at least one processor, cause the at least one processor to perform operations including: transmitting multi-factor authentication data to a computing device; transmitting a private key to an authentication device; generating, on the computing device, encrypted data based on the multi-factor authentication data; transmitting the encrypted data to the authentication device via a short-distance communication protocol; confirming proximity between the computing device and the authentication device by decrypting the encrypted data via the private key; and enabling a user access to a service on the computing device based on the confirming of the proximity between the computing device and the authentication device.

In some aspects, an apparatus can include one or more means for performing any function disclosed herein.

EXAMPLE EMBODIMENTS

The present disclosure increases the security hardening of two-factor authentication via mobile push notifications. Traditional push notifications are subject to phishing and multi-factor authentication fatigue attacks. It may be too easy to convince a person to simply approve a push authentication via a bad actor creating a text message sent to the user. In other cases, the user may be required to type in a long numerical code shown on one device into another device which can be subject to error, which then may require resending the code. This approach adds deliberate friction (i.e., by requiring the user to type in the code rather than just approving the code via a single interaction with an object or button) and become frustrating to the user if the process needs to be repeated. But again, the approach becomes more phishable via social engineering efforts. The approach disclosed herein mitigates the risks of phishing by adding into the overall process a requirement of a confirmation of an encrypted code transmitted between two local device via a communication protocol such as BlueTooth, Near-Field Communication or the like. The approach ties together several concepts including using encryption for secure codes plus a proximity determination between two devices. In one example, a computer 104 may use an application to implement the process. One non-limiting example is the Cisco Duo Health Application. The approach provides an improved verified push process in which an implicit proximity determination is added to a secure communication to improve the multi-factor authentication process. The disclosed approach improves both the user experience and improves the security of the process over a standard multi-factor authentication push process.

FIG. 1 illustrates a network 102 including a computer 104 that a user desires to log into for accessing a service. The user Jane Doe enters her name and password which data is transmitted 114 via network 106 to a server 108. Two-factor authentication relies on two "factors" in the authentication process. The two-factor authentication approach relates to something a person knows (i.e., a password) and something the person has (i.e., a mobile device 110). In some cases, the "thing you have" may be a mobile phone application previously registered with a service, such that it can receive push notifications in order to authenticate.

As shown in FIG. 1, when the user enters the proper password as confirmed by the server 108, the server will then transmit 118 via a push notification and through the network 106 a service code 110. The service code 110 can be an authentication code and is typically numeric. The user then enters via a user interface 112 the service code 110 on the computer 104. This is typically a manual process. The computer 104 then reports the proper service code 116 to the server 108 via the network 106. If the proper service code 110 is entered, then the user can gain access to the computer 104 or the requested service.

As noted above, push notifications alone have the potential vulnerability of being phished. A malicious actor may compromise somebody's first factor (their password), trigger sending a push notification to the mobile device, and then use social engineering to convince the person to press an "Approve" button. There are a number of ways that a bad actor can take advantage of the two-factor authentication process.

In order to address the weaknesses in the two-factor authentication process, the present disclosure changes the process to require at least in part the transmission of an encrypted code using a wireless communication channel that is local between two devices. For example, Bluetooth as a wireless protocol has a range of approximately 30 feet. One example in that context is that a wireless protocol having a range of approximately 40 feet or less. In another example, a near field communication (NFC) is much shorter at 10 centimeters. In another example, a WiFi communication protocol has a range of approximately 150 feet or over 45 meters. This range also could be considered local. The range contemplated within this disclosure is generally not beyond 45 meters. The overall concept is that the proof of proximity of two devices involved in the two-factor authentication process can improve security. In one aspect, the closer the devices, the more secure the authentication process can be. The local wireless network 220 generally represents a short-distance communication channel typically less than 150 feet. In one example, the local wireless network 220 uses the BlueTooth protocol which has a distance of approximately 30 feet or less.

Figure 2:
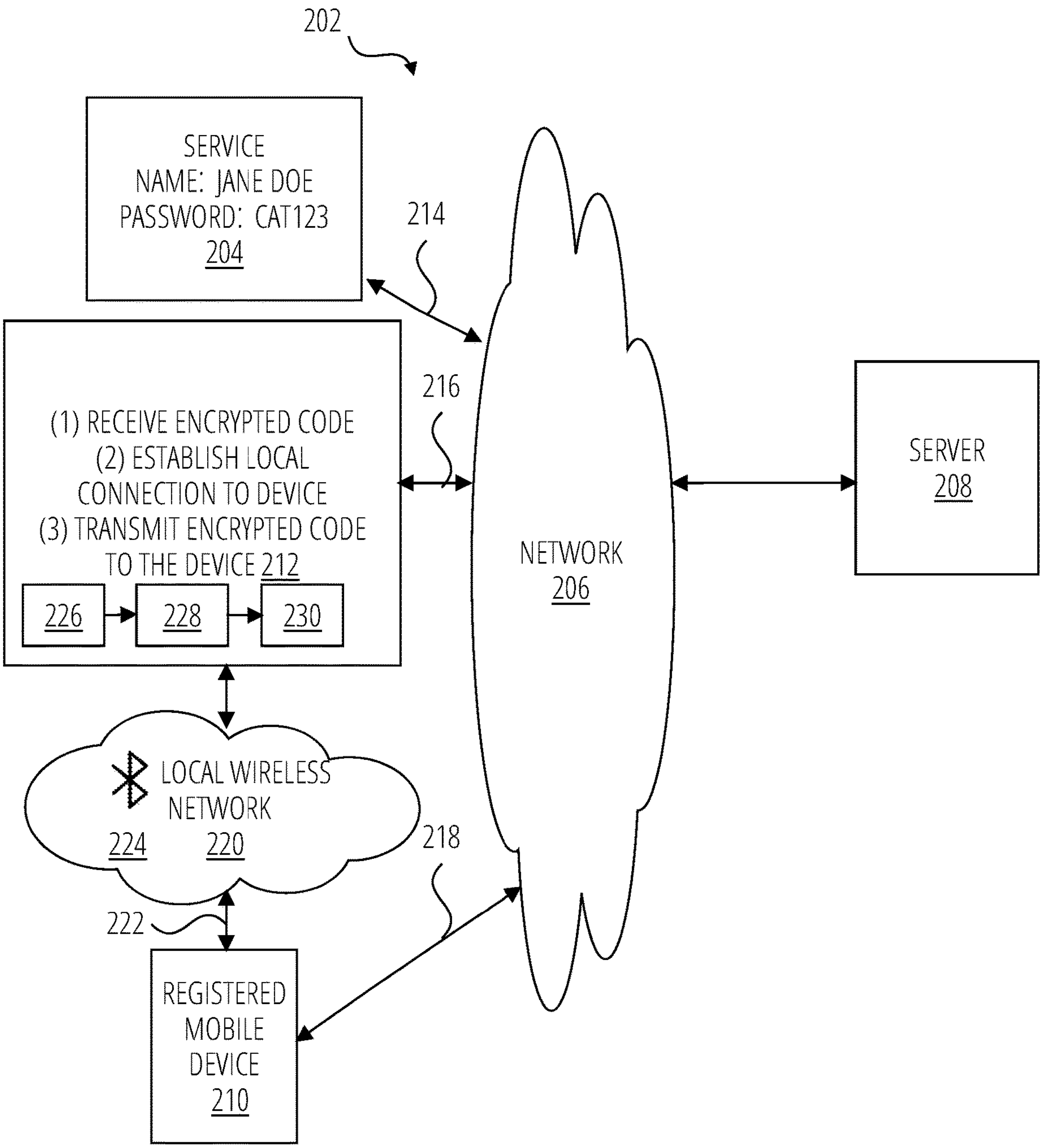
FIG. 2 illustrates the hardware and communication flow for an aspect of this disclosure related to proximity based two factor authentication.

As shown in FIG. 2, a network 202 includes a computing device 204 with a user interface (i.e., a browser or application 226) that a user interacts with to provide personal data such as a name and password. The computing device 204 transmits 214 the login name and password through a network 206 to a back-end server 208. The back-end server 208 confirms the login name and password and initiates the proof-of-proximity authentication process. First, the back-end server 208 transmits 216 via the network 206 an encryption public key to the browser or application 226 on the computing device 204. The encryption public key is the key that is used to confirm local proximity of the computing device 204 and one other device which can be a registered mobile device 210. The computing device 204 can have an application such as a "health" application 228 that can be used to encrypt a verification code for use in proximity confirmation. The verification code can be text, numbers, or alphanumeric in nature.

The browser or application 226 can provide a verification code or verification code information (which may or may not be the encrypted public key or secure code) to the health application 228 which can encrypt the verification code using the public key to generate an encrypted verification code and then transmit the encrypted verification code to a communication component 230 which can enable transmission via an antenna of the encrypted verification code. The communication component 230 can use, for example, a BlueTooth protocol 224 for transmitting the encrypted verification code over a local wireless network 220 to the registered mobile device 210. The transmission of the encrypted verification code can be structured as a broadcast of the encrypted verification code. One is can be related to how the registered mobile device 210 can receive the broadcasted encrypted verification code and decode the verification code without the need of any user interaction to make the process both secure and easy to use.

The registered mobile device 210 can be characterized as a registered mobile device 210 is used for authentication of the user. The registered mobile device 210 can be characterized as a registered mobile device as well. The registered mobile device 210 becomes registered when it receives a private key from the server 208 that is used to decrypt the encrypted verification code. In one example, multiple mobile devices might be able to receive or detect the broadcasted encrypted verification code but without the private key, such mobile devices will not be able to decrypt the code and complete the authentication of the user. Further, mobile devices that are too far away (e.g., outside the range of the BlueTooth or other protocol) will simply never receive the broadcasted encrypted verification code. Thus, by using a local or short distance wireless protocol, by definition a mobile device that receives the broadcasted encrypted verification code will be in "proximity" to the computing device 204.

The communications represented by channel 214 and 216 can be implemented via an application programming interface which can have its calls and functionality built into a browser or application 226 and that can be used to receive data from the back-end server 208. For example, when initiating the process, the back-end server 208 may provide a verification code, device information (i.e., information which can identify the registered mobile device 210) and/or a public encryption key to the browser or application 226. This information can be transmitted via localhost process to other applications or components as described herein. The data received from the back-end server 208 at the computing device 204 can generally be characterized as multi-factor authentication data which can include one or more of the type of data described above to achieve the authentication process disclosed herein.

The back-end server 208 also transmits 218 a push notification to the registered mobile device 210. The push notification can include one or more of current information about the computing device 204, one-time use data associated with the authentication, a private key used to detect and/or decrypt the broadcasted encrypted verification code, and/or other data related to a transaction. The data in the push notification can be used to limit or confirm which device 210 the computing device 204 should establish a connection with. For example, by receiving the push notification, the registered mobile device 210 can become "registered" in the sense that it will be recognized by the computing device 204 as the proper mobile device with the credentials to decrypt the broadcasted encrypted verification code.

Based on the use of the push notification, a local wireless communication link is established between the computing device 204 and the registered mobile device 210. As noted above, the protocol used to establish the communication link can be within a number of centimeters (i.e., 20 centimeters or less) via near-field communication (NFC) protocol, or within 5-15 meters using a BlueTooth protocol or within say 100-200 feet using a WiFi protocol. The use of a local wireless protocol helps to establish a proof of proximity of the two devices. Depending on which wireless protocol that is used, the computing device 204 and/or the registered mobile device 210 may also be able to establish how far apart they are (or a range of how far apart that they are) and assign a confidence level in the authentication of the user. The closer the devices are to each other, the higher the confidence. In some cases, the distance may generally be short (5-15 meters) but is still far enough to open up the possibility of a mobile device in a neighboring room that the user may not be aware of.

Once the communication channel is established between the computing device 204 and the registered mobile device 210, then the devices can communicate data. The computing device 204 transmits 222 via a local wireless network 220 the encrypted verification code to the registered mobile device 210. The computing device 204 advertises or broadcasts the access to the encrypted verification code via the local wireless protocol where the registered mobile device 210 can scan for relevant in-flight authentication advertisements and then can decrypt the verification code with a private key received from the back-end server 208. Note that the publicly advertised local wireless data is already completely encrypted (i.e., via RSA-2048 for example). The only device that can decrypt and read the verification code is the phone with the correct private key and that has proximity to the computing device 204. Furthermore, in one aspect, the process can be an automated and the registered mobile device 210 is already identified via the device identification data with the computing device 204. Thus, there is no manual pairing requirement as would normally occur via a BlueTooth connection. In other words, because of the data received at the computing device 204 can identifies the registered mobile device 210, there may be no need to manually pair the devices for communication between them. The information about the registered mobile device 210 can be added to a list of devices considered as "paired" with the computing device 204. A similar operation can occur on the registered mobile device 210 in that the data it receives from the back-end server 208 can enable a listing of the computing device 204 to be added to a list of paired devices via BlueTooth. Other protocols might require a different type of change to approved lists of devices according to the respective protocol. Thus, process used to eliminate the need for a manual connection between devices might different depending on the wireless protocol used for communication.

The disclosed model can be implemented in any context including the context of a verified push when a user tries to log in to the computing device 204. The authentication prompt triggers the sending of a push notification to the given registered mobile device 210. At the same time, the system transmits a code to the health application 228 installed on the computer. 204 The health application 228 uses the computer's local wireless capabilities to establish a connection with the registered mobile device 210 that a push was sent to. Via that connection, the encrypted verified push code is transmitted 222 to the registered mobile device 210 for the registered mobile device 210 to decrypt using the private key and then submit the result confirming the correct data the back-end server 208. In this manner, the registered mobile device 210 approves the authentication push. This is independent of any manual pairing operation performed by a user and in one aspect explicitly does not require manual intervention to establish the communication, descript broadcasted verification code and notify the back-end server 208 of the successful authentication.

Thus, one of the improvements in the disclosed process is that it eliminates the need for the user to manually pair the devices or for the user to manually type in the security code into their mobile device or the computer 204. The registered mobile device 210 that has the private key and the encrypted verification code transmitted via the local wireless network 220 can decrypt the verification code and authenticate the user.

Figure 3A:
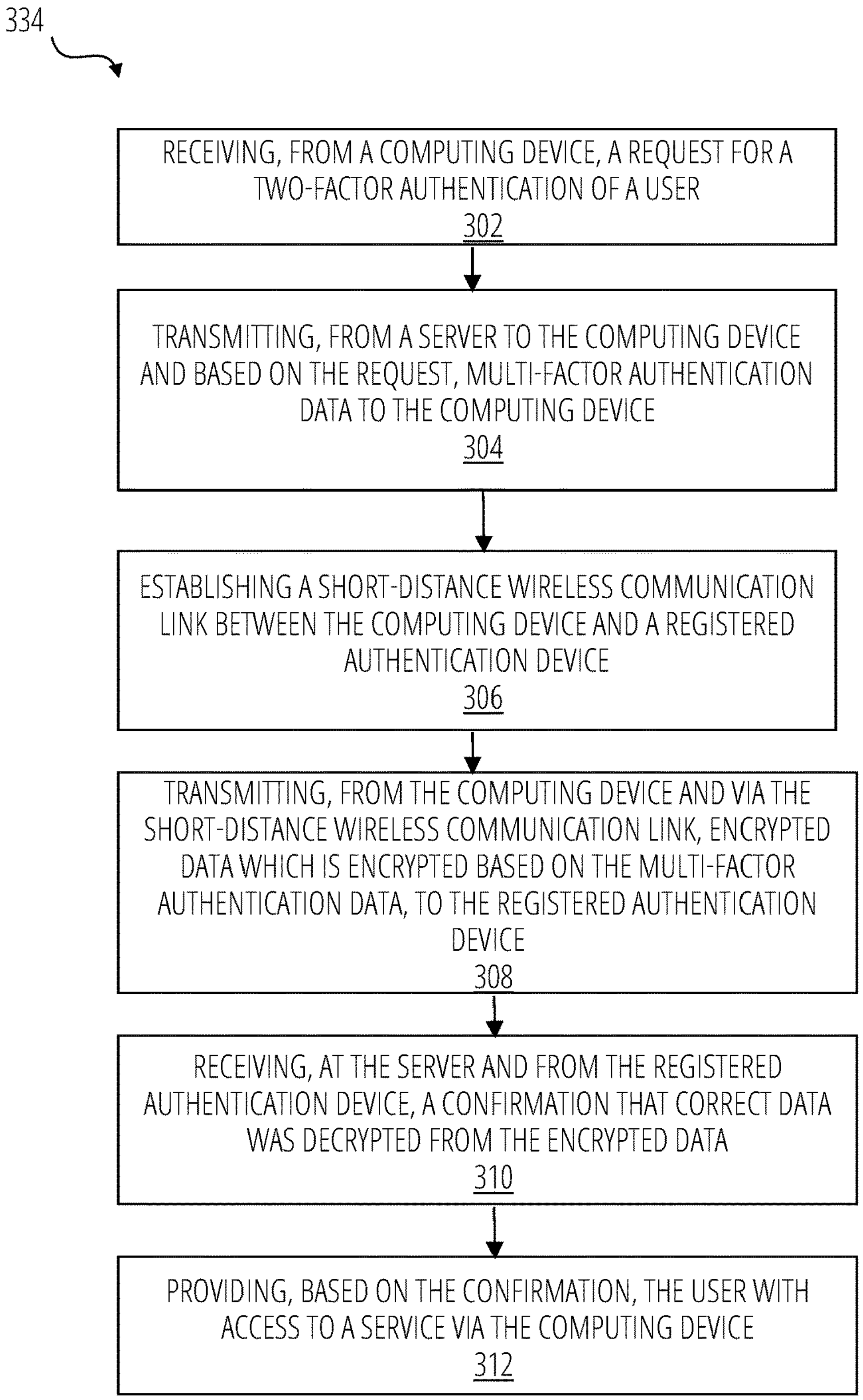
FIG. 3A illustrates a method embodiment according to an aspect of this disclosure.

FIG. 3A illustrates an example method 326 for performing multi-factor authentication. The method 326 can include one or more of receiving, from a computing device (e.g., computing device 204), a request for a two-factor authentication of a user (302), transmitting, from a server (e.g., the back-end server 208) to the computing device and based on the request, multi-factor authentication data to the computing device (304), establishing a short-distance wireless communication link between the computing device and a registered mobile device (e.g., the registered mobile device 210) (306), transmitting, from the computing device and via the short-distance wireless communication link, encrypted data which is encrypted based on the multi-factor authentication data, to the registered mobile device (308), receiving, at the server and from the registered mobile device, a confirmation that corrected data was decrypted from the encrypted data (310) and providing, based on the confirmation and via the server, the user with access to a service via the computing device (310). The confirmation process can be performed in which the code is verified automatically without user intervention or the need for the user to type in any code.

In one aspect, the registered mobile device 210 can be a mobile phone. The short-distance wireless communication link 222 can include one or more of a Bluetooth connection 224, a near-field communication connection or a WiFi connection. In one aspect, the method is iteratively applied based on a confidence level of the confirmation which is associated with one or more of a proximity between the computing device and the registered mobile device and a wireless protocol used for the short-distance wireless communication link. The closer the proximity, the higher the confidence level in the confirmation.

The multi-factor authentication data can include one or more of a private key, identification information for the registered mobile device and a verification code. The multi-factor authentication data can include a verification code and a public key. In one aspect, the method further can include transmitting a private key to the registered mobile device (e.g., the registered mobile device 210), wherein the registered mobile device uses the private key to decrypt an encrypted verification code to generate the confirmation.

The step of establishing the short-distance wireless communication link between the computing device and the registered mobile device can occur without manual intervention of the user. In another aspect, the registered mobile device 210 receives a private key from the server, the private key being used to decrypt the encrypted data to generate the confirmation. These steps can occur without the need for or independent of user intervention.

In some aspects, the techniques described herein relate to a system for authenticating a user, the system including: at least one processor; and a computer-readable storage device storing instructions which, when executed by the at least one processor, cause the at least one processor to perform operations including one or more of: receiving, from a computing device, a request for a two-factor authentication of a user; transmitting, to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, from the registered mobile device, a confirmation that corrected data was decrypted from the encrypted data; and providing, based on the confirmation, the user with access to a service via the computing device. Note that in one aspect, the "system" can include multiple devices and operations which are performed on more than one device (i.e., the server 208 plus the computing device 204). In other aspects an embodiment might be developed or covered which includes operations performed on a single device related to the overall proximity-based multi-factor authentication process. For example, operations performed just by the server 208, the computing device 204 or the registered mobile device 210 can be claimed as well.

In some aspects, the techniques described herein relate to a computer-readable storage device storing instructions which, when executed by at least one processor, cause the at least one processor to perform operations including: receiving a request for a two-factor authentication of a user; transmitting, from a server to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device 210; receiving, at the server and from the registered mobile device, a confirmation that corrected data was decrypted from the encrypted data; and providing, based on the confirmation, the user with access to a service via the computing device.

Figure 3B:
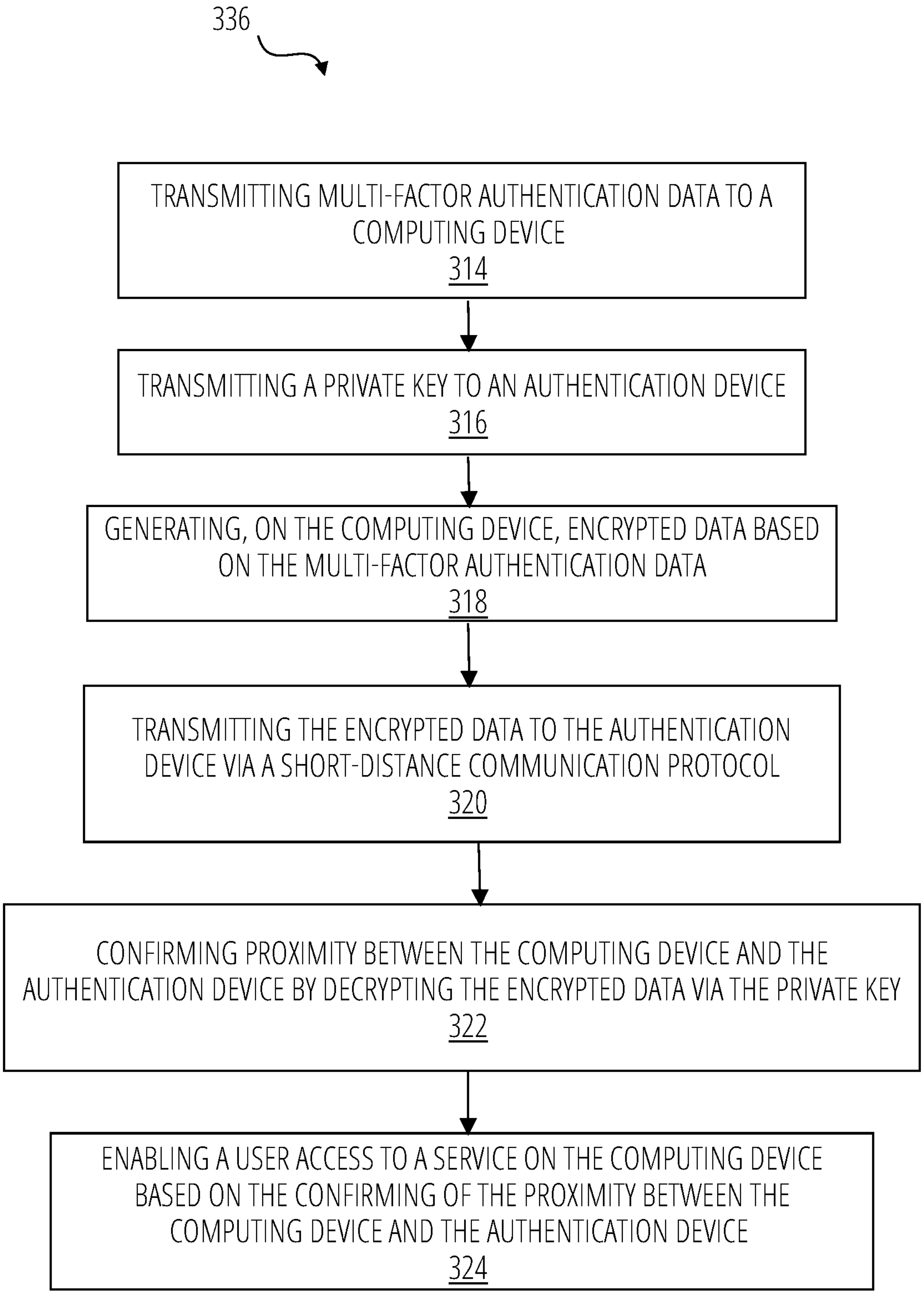
FIG. 3B illustrates another method embodiment according to an aspect of this disclosure.

FIG. 3B illustrates another method 328 according to an aspect of this disclosure. The method 328 includes transmitting multi-factor authentication data to a computing device (314), transmitting a private key to an authentication device (316), generating, on the computing device, encrypted data based on the multi-factor authentication data (318), transmitting the encrypted data to the authentication device via a short-distance communication protocol (320), confirming proximity between the computing device and the authentication device by decrypting the encrypted data via the private key (322) and enabling a user access to a service on the computing device based on the confirming of the proximity between the computing device and the authentication device (324). In some aspects, the method might only include those steps occurring on one of the devices disclosed herein and the other steps may be recited in a passive manner as not part of the primary method as they are occurring on a different device.

In some aspects, the techniques described herein relate to a system for authenticating a user, the system including: at least one processor; and a computer-readable storage device storing instructions which, when executed by the at least one processor, cause the at least one processor to perform operations including one or more of: transmitting multi-factor authentication data to a computing device; transmitting a private key to an authentication device; generating, on the computing device, encrypted data based on the multi-factor authentication data; transmitting the encrypted data to the authentication device via a short-distance communication protocol; confirming proximity between the computing device and the authentication device by decrypting the encrypted data via the private key; and enabling a user access to a service on the computing device based on the confirming of the proximity between the computing device and the authentication device.

In one aspect, the system may also establish a threshold distance and an associated confidence level. For example, if the distance between devices is relatively low, such as between a few inches and 15 feet, for example, then the confidence level in the proximity-based multi-factor authentication process can be deemed to be high. However, if the parties are using WiFi as the communication protocol and the distance is say 100 feet, then the confidence level might be low. In such a case, then a number of factors might be applied to determine whether to accept the authentication. If, for example, the service required has a lower threshold of confidence in the authentication to enable access, then the user might be granted access even though there is lower confidence in the authentication.

However, if the application or service requires a high level of confidence, then the system may implement another instance or iteration of the proximity-based multi-factor authentication with a different device that is closer or uses a different wireless protocol to obtain a higher-confidence authentication. In one example, the registered mobile device 210 in such a case might become the initiating device and yet another device (not shown) may be the new registered mobile device which needs to be within a threshold distance or have close proximity to the primary device. In another aspect, the user of the registered mobile device 210 might be prompted to turn on BlueTooth or to change wireless protocols and move closer to the computing device 204 in order to increase the confidence in the proximity-based multi-factor authentication process.

In such a case, the authentication process and the transmission of a public key to the computing device 204 and a private key to the registered mobile device 210 may occur again to re-establish the proximity using the different wireless protocol and to reconfirm the registered mobile device 210 as having the proper (updated) proximity and the ability to decrypt the updated broadcasted encrypted verification code. In this manner, the confidence in the authentication can be updated to be high rather than low and upon confirmation by the registered mobile device 210 at the back-end server 208, the user can gain access to the service on the computing device 204.

Figure 3C:
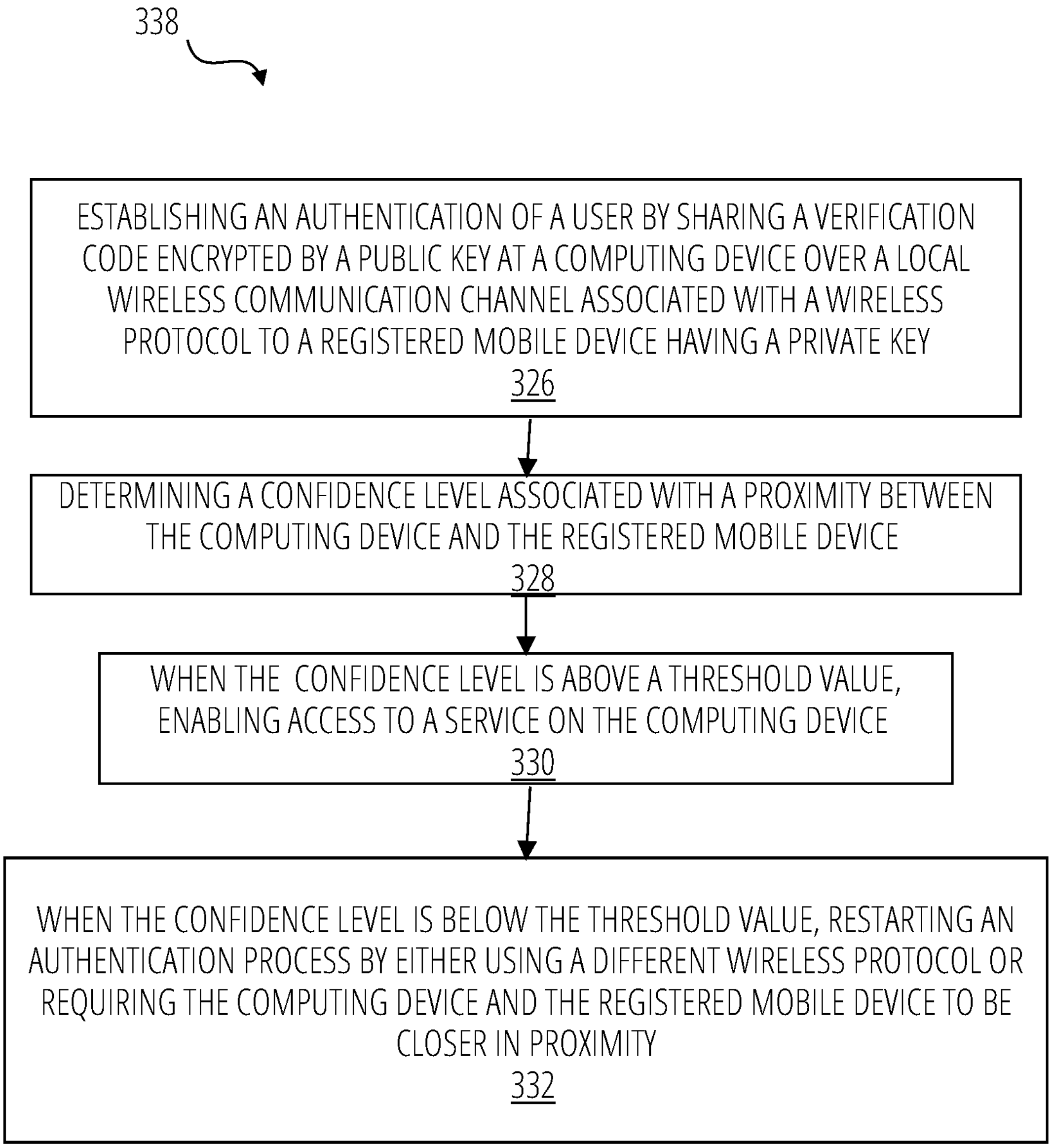
FIG. 3C illustrates another method embodiment according to an aspect of this disclosure.

A method with respect to managing a confidence level of an authentication is shown in FIG. 3C. A method 338 can include establishing an authentication of a user by sharing a verification code encrypted by a public key at a computing device over a local wireless communication channel associated with a wireless protocol to a registered mobile device having a private key (326); determining a confidence level associated with a proximity between the computing device and the registered mobile device (328); when the confidence level is above a threshold value, enabling access to a service on the computing device (330); and when the confidence level is below the threshold value, restarting an authentication process by either using a different wireless protocol or requiring the computing device and the registered mobile device to be closer in proximity (332).

The restarting of the authentication process can include resending a public key to the computing device 204 and resending a private key to the mobile device to yield or generate the registered mobile device 210. With the new keys, the computing device 204 can broadcast the encrypted verification code for the registered mobile device 210 to receive and decrypt. The system can then determine if the proximity has improved. This can mean for example, that in the second iteration of the authentication process, the question is whether the mobile device 210 has moved closer to the computing device 204. For example, if the registered mobile device 210 moved from 30 feet away and had used WiFi as the wireless protocol, in the second iteration, the system might use BlueTooth and confirm that the registered mobile device 210 is 5 feet away and thus the confidence level in the authentication can be increased. The likelihood of the mobile device in this scenario is much less that the mobile device 210 is in another room. The approach may require or use more than two iterations as well. The system may determine that a threshold for a certain service may require the use of a near-field communication wireless protocol and require the user who authenticated using a WiFi protocol, and then a BlueTooth protocol, to finally a third iteration using a NFC protocol in which the devices are centimeters or millimeters apart.

In one aspect, a system can include a system for authenticating a user, the system including: at least one processor; and a computer-readable storage device storing instructions which, when executed by the at least one processor, cause the at least one processor to perform operations including one or more of: establishing an authentication of a user by sharing a verification code encrypted by a public key at a computing device over a local wireless communication channel associated with a wireless protocol to a registered mobile device having a private key; determining a confidence level associated with a proximity between the computing device and the registered mobile device; when the confidence level is above a threshold value, enabling access to a service on the computing device; and when the confidence level is below the threshold value, restarting an authentication process by either using a different wireless protocol or requiring the computing device and the registered mobile device to be closer in proximity.

In any given iteration, other changes might occur in the authentication process. For example, the complexity of the public key and/or the private key might be altered to increase the encryption strength and increase the confidence in the authentication process. Additional layers of authentication might be required such as using facial recognition or fingerprint recognition (or other biological recognition such as an eye scan) to confirm an identity of a user.

In another aspect, in order to achieve a facial recognition result or a fingerprint recognition result, the user must be able to either touch the mobile device or be close enough in proximity for facial recognition. Thus, one aspect of this disclosure can include the use of facial recognition and/or fingerprint recognition. Then system may in this regard not necessarily need to obtain the actual identity of the user but may just need a confirmation that the facial or fingerprint recognition was successful. In such a case, then the proximity of the user is implicit in the success of the authentication. In one sense, this is another way to prove proximity between the user and a device. That close proximity can enhance a confidence level in the authentication process disclose herein.

The methods and systems disclosed herein can also be altered to cover methods or devices from a different standpoint. For example, the overall system requires a computing device 204, a back-end server 208 and a registered mobile device 210. A "system" can include all three of these devices and processes or operations performed by each device as part of the authentication process. Alternatively, each device can stand alone as an embodiment and methods can be claimed from just the standpoint of any specific device such as the back-end server 208, the computing device 204 and/or the registered mobile device 210.

In one example, in an embodiment covering the back-end server 208, the back-end server 208 transmits a public key to the computing device 204. In an embodiment covering the computing device 204, the computing device would "receive" the public key. In an embodiment covering the back-end server 208, the back-end server 208 transmits a private key to the registered mobile device 204. In an embodiment covering the registered mobile device 204, the registered mobile device 210 would "receive" the private key.

Any operation or step disclosed above can be combined with any other step or operation. Thus, each example described above provides a disclosure of the various features but they can be mixed and matched and are not contemplated as being completely separate embodiments.

Figure 4:
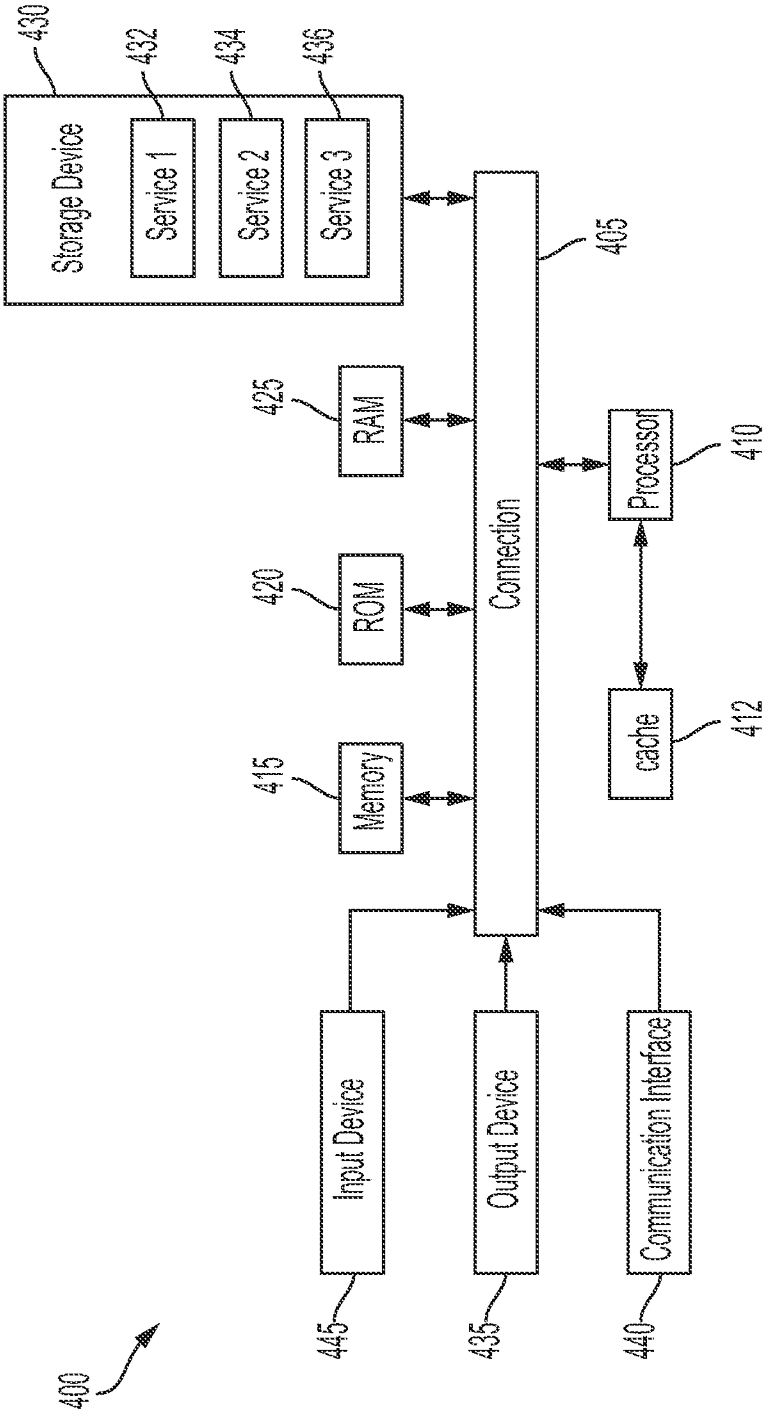
FIG. 4 illustrates an aspect of the subject matter in accordance with one embodiment.

FIG. 4 is a diagram illustrating an example of a system for implementing certain aspects of the present technology. In particular, FIG. 4 illustrates an example of computing system 400, which can be for example any computing device making up internal computing system, a remote computing system, a camera, or any component thereof in which the components of the system are in communication with each other using connection 405. Connection 405 can be a physical connection using a bus, or a direct connection into processor 410, such as in a chipset architecture. Connection 405 can also be a virtual connection, networked connection, or logical connection.

In some aspects, computing system 400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 400 includes at least one processing unit (CPU or processor) 410 and connection 405 that couples various system components including system memory 415, such as read-only memory (ROM) 420 and random-access memory (RAM) 425 to processor 410. Computing system 400 can include a cache 411 of high-speed memory connected directly with, in close proximity to, or integrated as part of processor 410.

Processor 410 can include any general-purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms. In some instances, multimodal systems can enable a user to provide multiple types of input/output to communicate with computing system 400. Computing system 400 can include communications interface 440, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 430 can include software services, servers, services, etc., that when the code that defines such software is executed by the processor 410, it causes the system to perform a function. In some aspects, a hardware service that performs a particular function can include the software component stored in a computer-readable medium in connection with the necessary hardware components, such as processor 410, connection 405, output device 435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules, engines, or components may be implemented together in an integrated logic device or separately as discrete but interoperable logic devices. If implemented in software, then the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Clauses of the disclosure include:

Clause 1. A method of authenticating a user, the method comprising: receiving, from a computing device, a request for a two-factor authentication of a user; transmitting, from a server to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, at the server and from the registered mobile device, a confirmation that corrected data was decrypted from the encrypted data; and providing, based on the confirmation, the user with access to a service via the computing device.

Clause 2. The method of clause 1, wherein the method is iteratively applied based on a confidence level of the confirmation which is associated with one or more of a proximity between the computing device and the registered mobile device and a wireless protocol used for the short-distance wireless communication link.

Clause 3. The method of clause 1 or any previous clause, wherein the short-distance wireless communication link comprises one or more of a Bluetooth connection, a near-field communication connection or a WiFi connection.

Clause 4. The method of clause 1 or any previous clause, wherein the multi-factor authentication data comprises one or more of a private key, identification information for the registered mobile device and a verification code.

Clause 5. The method of clause 1 or any previous clause, wherein the multi-factor authentication data comprises a verification code and a public key, the method further comprising: transmitting a private key to the registered mobile device, wherein the registered mobile device uses the private key to decrypt an encrypted verification code to generate the confirmation.

Clause 6. The method of clause 1 or any previous clause, wherein establishing the short-distance wireless communication link between the computing device and the registered mobile device occurs without manual intervention of the user and wherein the confirmation can be performed in which the code is verified automatically without user intervention or the need for the user to type in any code.

Clause 7. The method of clause 1 or any previous clause, wherein the registered mobile device receives a private key from the server, the private key being used to decrypt the encrypted data to generate the confirmation.

Clause 8. A system for authenticating a user, the system comprising: at least one processor; and a computer-readable storage device storing instructions which, when executed by the at least one processor, cause the at least one processor to perform operations comprising: receiving, from a computing device, a request for a two-factor authentication of a user; transmitting, to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, from the registered mobile device, a confirmation that corrected data was decrypted from the encrypted data; and providing, based on the confirmation, the user with access to a service via the computing device.

Clause 9. The system of clause 8, wherein the operations are iteratively applied based on a confidence level of the confirmation which is associated with one or more of a proximity between the computing device and the registered mobile device and a wireless protocol used for the short-distance wireless communication link.

Clause 10. The system of clause 8 or any previous clause, wherein the short-distance wireless communication link comprises one or more of a Bluetooth connection, a near-field communication connection or a WiFi connection.

Clause 11. The system of clause 8 or any previous clause, wherein the multi-factor authentication data comprises one or more of a private key, identification information for the registered mobile device and a verification code.

Clause 12. The system of clause 8 or any previous clause, wherein the multi-factor authentication data comprises a verification code and a public key, and wherein the computer-readable storage device stores additional instructions which, when executed by the at least one processor, cause the at least one processor to perform operations further comprising: transmitting a private key to the registered mobile device, wherein the registered mobile device uses the private key to decrypt an encrypted verification code to generate the confirmation.

Clause 13. The system of clause 8 or any previous clause, wherein establishing the short-distance wireless communication link between the computing device and the registered mobile device occurs without manual intervention of the user.

Clause 14. The system of clause 8 or any previous clause, wherein the registered mobile device receives a private key from the server, the private key being used to decrypt the encrypted data to generate the confirmation.

Clause 15. A computer-readable storage device storing instructions which, when executed by at least one processor, cause the at least one processor to perform operations comprising: receiving a request for a two-factor authentication of a user; transmitting, from a server to the computing device and based on the request, multi-factor authentication data to the computing device; establishing a short-distance wireless communication link between the computing device and a registered mobile device; transmitting, from the computing device and via the short-distance wireless communication link, encrypted data which is encrypted based on the multi-factor authentication data, to the registered mobile device; receiving, at the server and from the registered mobile device, a confirmation that corrected data was decrypted from the encrypted data; and providing, based on the confirmation, the user with access to a service via the computing device.

Clause 16. The computer-readable storage device of clause 15, wherein the operations are iteratively applied based on a confidence level of the confirmation which is associated with one or more of a proximity between the computing device and the registered mobile device and a wireless protocol used for the short-distance wireless communication link.

Clause 17. The computer-readable storage device of clause 15 or any previous clause, wherein the short-distance wireless communication link comprises one or more of a Bluetooth connection, a near-field communication connection or a WiFi connection and wherein the multi-factor authentication data comprises one or more of a private key, identification information for the registered mobile device and a verification code.

Clause 18. The computer-readable storage device of clause 15 or any previous clause, wherein the multi-factor authentication data comprises a verification code and a public key, and wherein the computer-readable storage device stores additional instructions which, when executed by the at least one processor, cause the at least one processor to perform operations further comprising: transmitting a private key to the registered mobile device, wherein the registered mobile device uses the private key to decrypt an encrypted verification code to generate the confirmation.

Clause 19. The computer-readable storage device of clause 15 or any previous clause, wherein establishing the short-distance wireless communication link between the computing device and the registered mobile device occurs without manual intervention of the user.

Clause 20. The computer-readable storage device of clause 15 or any previous clause, wherein the registered mobile device receives a private key from the server, the private key being used to decrypt the encrypted data to generate the confirmation.

Clause 21. A method comprising: transmitting multi-factor authentication data to a computing device; transmitting a private key to an authentication device; generating, on the computing device, encrypted data based on the multi-factor authentication data; transmitting the encrypted data to the authentication device via a short-distance communication protocol; confirming proximity between the computing device and the authentication device by decrypting the encrypted data via the private key; and enabling a user access to a service on the computing device based on the confirming of the proximity between the computing device and the authentication device.

Clause 22. A system for authenticating a user, the system comprising: at least one processor; and a computer-readable storage device storing instructions which, when executed by the at least one processor, cause the at least one processor to perform operations comprising: transmitting multi-factor authentication data to a computing device; transmitting a private key to an authentication device; generating, on the computing device, encrypted data based on the multi-factor authentication data; transmitting the encrypted data to the authentication device via a short-distance communication protocol; confirming proximity between the computing device and the authentication device by decrypting the encrypted data via the private key; and enabling a user access to a service on the computing device based on the confirming of the proximity between the computing device and the authentication device.

Clause 23. A method with respect to managing a confidence level of an authentication can include: establishing an authentication of a user by sharing a verification code encrypted by a public key at a computing device over a local wireless communication channel associated with a wireless protocol to a registered mobile device having a private key; determining a confidence level associated with a proximity between the computing device and the registered mobile device; when the confidence level is above a threshold value, enabling access to a service on the computing device; and when the confidence level is below the threshold value, restarting an authentication process by either using a different wireless protocol or requiring the computing device and the registered mobile device to be closer in proximity.

Clause 24. A system for authenticating a user can include: at least one processor; and a computer-readable storage device storing instructions which, when executed by the at least one processor, cause the at least one processor to perform operations including one or more of: establishing an authentication of a user by sharing a verification code encrypted by a public key at a computing device over a local wireless communication channel associated with a wireless protocol to a registered mobile device having a private key; determining a confidence level associated with a proximity between the computing device and the registered mobile device; when the confidence level is above a threshold value, enabling access to a service on the computing device; and when the confidence level is below the threshold value, restarting an authentication process by either using a different wireless protocol or requiring the computing device and the registered mobile device to be closer in proximity.

What is claimed is:

1. A method of authenticating a user, the method comprising:

transmitting, from a computing device, a request for a two-factor authentication of a user;

receiving, from a server and at the computing device and based on the request, multi-factor authentication data;

establishing a short-distance wireless communication link between the computing device and a registered mobile device;

generating, at the computing device, a verification code derived from the multi-factor authentication data and encrypting the verification code using a public key established for the short-distance wireless communication link to obtain an encrypted verification code, the public key being used to confirm local proximity between the computing device and the registered mobile device;

transmitting, from the computing device and via the short-distance wireless communication link, the encrypted verification code to the registered mobile device, wherein the registered mobile device provides a confirmation to the server, based on a confidence level, that correct data was decrypted from the encrypted verification code, wherein the confidence level is determined based on (1) a proximity measurement between the computing device and the registered mobile device and (2) a wireless protocol used for the short-distance wireless communication link; and obtaining, based on the confirmation, access to a service via the computing device, wherein the confidence level further requires that the proximity measurement indicates a physical separation less than a predetermined threshold distance, and wherein the computing device and the registered mobile device perform an authentication automatically without requiring the user to enter any verification code.

2. The method of claim 1, wherein the short-distance wireless communication link comprises one or more of a Bluetooth connection, a near-field communication connection or a WiFi connection.

3. The method of claim 1, wherein the multi-factor authentication data comprises one or more of a private key, identification information for the registered mobile device and a verification code.

4. The method of claim 1, wherein the multi-factor authentication data comprises a verification code and a public key, the method further comprising:

transmitting a private key to a mobile device to yield the registered mobile device, wherein the registered mobile device uses the private key to decrypt an encrypted verification code to generate the confirmation.

5. The method of claim 1, wherein establishing the short-distance wireless communication link between the computing device and the registered mobile device occurs without manual intervention of the user in which the confirmation is verified automatically without a need for the user to type in any code.

6. The method of claim 1, wherein the registered mobile device receives a private key from the server, the private key being used to decrypt the encrypted verification code to generate the confirmation.

7. A system for authenticating a user, the system comprising:

at least one processor; and a computer-readable storage device storing instructions which, when executed by the at least one processor, cause the at least one processor to perform operations comprising:

transmitting, to a server, a request for a two-factor authentication of a user;

receiving, based on the request, multi-factor authentication data;

establishing a short-distance wireless communication link between the system and a registered mobile device;

generating a verification code derived from the multi-factor authentication data and encrypting the verification code using a public key established for the short-distance wireless communication link to obtain an encrypted verification code, the public key being used to confirm local proximity between the system and the registered mobile device;

transmitting, via the short-distance wireless communication link, the encrypted verification code to the registered mobile device, wherein the registered mobile device provides a confirmation to the server, based on a confidence level, that correct data was decrypted from the encrypted verification code, wherein the confidence level is determined based on (1) a proximity measurement between the system and the registered mobile device and (2) a wireless protocol used for the short-distance wireless communication link; and obtaining, based on the confirmation, the user with access to a service via the system, wherein the confidence level further requires that the proximity measurement indicates a physical separation less than a predetermined threshold distance, and wherein the system and the registered mobile device perform an authentication automatically without requiring the user to enter any verification code.

8. The system of claim 7, wherein the short-distance wireless communication link comprises one or more of a Bluetooth connection, a near-field communication connection or a WiFi connection.

9. The system of claim 7, wherein the multi-factor authentication data comprises one or more of a private key, identification information for the registered mobile device and a verification code.

10. The system of claim 7, wherein the multi-factor authentication data comprises a verification code and a public key, and wherein the computer-readable storage device stores additional instructions which, when executed by the at least one processor, cause the at least one processor to perform operations further comprising:

transmitting a private key to the registered mobile device, wherein the registered mobile device uses the private key to decrypt an encrypted verification code to generate the confirmation.

11. The system of claim 7, wherein establishing the short-distance wireless communication link between the system and the registered mobile device occurs without manual intervention of the user.

12. The system of claim 7, wherein the registered mobile device receives a private key from the system, the private key being used to decrypt the encrypted verification code to generate the confirmation.

13. A non-transitory computer-readable storage device storing instructions which, when executed by at least one processor of a computing device, cause the at least one processor to perform operations comprising:

transmitting a request for a two-factor authentication of a user;

receiving, from a server and based on the request, multi-factor authentication data;

establishing a short-distance wireless communication link between the computing device and a registered mobile device;

generating a verification code derived from the multi-factor authentication data and encrypting the verification code using a public key established for the short-distance wireless communication link to obtain an encrypted verification code, the public key being used to confirm local proximity between the computing device and the registered mobile device;

transmitting, via the short-distance wireless communication link, the encrypted verification code to the registered mobile device, wherein the registered mobile device provides a confirmation, based on a confidence level, that correct data was decrypted from the encrypted verification code, wherein the confidence level is determined based on (1) a proximity measurement between the computing device and the registered mobile device and (2) a wireless protocol used for the short-distance wireless communication link; and obtaining, based on the confirmation, access to a service via the computing device, wherein the confidence level further requires that the proximity measurement indicates a physical separation less than a predetermined threshold distance, and wherein the computing device and the registered mobile device perform an authentication automatically without requiring the user to enter any verification code.

14. The non-transitory computer-readable storage device of claim 13, wherein the short-distance wireless communication link comprises one or more of a Bluetooth connection, a near-field communication connection or a WiFi connection and wherein the multi-factor authentication data comprises one or more of a private key, identification information for the registered mobile device and a verification code.

15. The non-transitory computer-readable storage device of claim 13, wherein the multi-factor authentication data comprises a verification code and a public key, and wherein the non-transitory computer-readable storage device stores additional instructions which, when executed by the at least one processor, cause the at least one processor to perform operations further comprising:

transmitting a private key to a mobile device to yield the registered mobile device, wherein the registered mobile device uses the private key to decrypt an encrypted verification code to generate the confirmation.

16. The non-transitory computer-readable storage device of claim 13, wherein establishing the short-distance wireless communication link between the computing device and the registered mobile device occurs without manual intervention of the user.

17. The non-transitory computer-readable storage device of claim 13, wherein the registered mobile device receives a private key, the private key being used to decrypt the encrypted verification code to generate the confirmation.

* * * * *